US007886975B2

(12) United States Patent
Matsuo et al.

(10) Patent No.: US 7,886,975 B2
(45) Date of Patent: Feb. 15, 2011

(54) DATA TRANSFER SYSTEM, DATA ACQUISITION DEVICE, DATA ACQUISITION METHOD, DATA ACCUMULATION DEVICE, DATA TRANSMISSION METHOD, AND PROGRAM FOR THE SAME

(75) Inventors: Takashi Matsuo, Tokyo (JP); Daisuke Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/996,046

(22) PCT Filed: Jul. 7, 2006

(86) PCT No.: PCT/JP2006/313568

§ 371 (c)(1),
(2), (4) Date: Apr. 4, 2008

(87) PCT Pub. No.: WO2007/010762

PCT Pub. Date: Jan. 25, 2007

(65) Prior Publication Data

US 2008/0191015 A1 Aug. 14, 2008

(30) Foreign Application Priority Data

Jul. 19, 2005 (JP) ............................. 2005-208697

(51) Int. Cl.
*G06K 7/00* (2006.01)
(52) U.S. Cl. ...................................... 235/439
(58) Field of Classification Search .................. 235/439
See application file for complete search history.

(56) References Cited

U.S. PATENT DOCUMENTS 5,299,197 A * 3/1994 Schlafly ..................... 370/477

| 5,787,101 | A | * | 7/1998 | Kelly | ..................... 714/800 |
|---|---|---|---|---|---|
| 2001/0055988 | A1 | * | 12/2001 | Blake et al. | ................ 455/575 |
| 2003/0218073 | A1 | * | 11/2003 | Arimura | ..................... 235/492 |
| 2004/0117378 | A1 | * | 6/2004 | Manandhar | ................... 707/10 |
| 2004/0225762 | A1 | | 11/2004 | Poo | |
| 2005/0109841 | A1 | * | 5/2005 | Ryan et al. | ................... 235/380 |
| 2005/0111420 | A1 | * | 5/2005 | Fujii | ......................... 370/338 |
| 2005/0184165 | A1 | * | 8/2005 | de Jong | ..................... 235/492 |
| 2006/0108411 | A1 | * | 5/2006 | Macurek et al. | ............. 235/375 |

FOREIGN PATENT DOCUMENTS

EP 0 798 675 10/1997

(Continued)

OTHER PUBLICATIONS

Shibuya, Atsushi, Non-contact Communications System, CIPO, 2,201,2232, pp. 1-34.*
Search and Examination Report for Singapore Patent Application No. 200800294-1, issued on Jan. 9, 2009.

*Primary Examiner*—Daniel A Hess
*Assistant Examiner*—Tabitha Chedekel
(74) *Attorney, Agent, or Firm*—K&L Gates LLP

(57) ABSTRACT

Processing efficiency of acquired data is improved by restricting saving or acquiring of unnecessary data. A data acquisition device 110 includes a communication unit 214 for performing wireless communication of data with a data accumulation device 100 in which data is accumulated, a type registration unit 216 wherein data types of necessary data are registered beforehand, a type comparison unit 218 for comparing the data type of data received via the wireless communication unit with data types registered in the type registration unit, a data extracting unit 220 for extracting only data of which the data type matches, and a data holding unit 222 for holding the extracted data.

17 Claims, 10 Drawing Sheets

FOREIGN PATENT DOCUMENTS

| | | |
|---|---|---|
| JP | 63-313289 | 12/1988 |
| JP | 09-269982 | 10/1997 |
| JP | 2001-160105 | 6/2001 |
| JP | 2003-030084 | 1/2003 |
| JP | 2005-45557 | 2/2005 |
| JP | 2005-157695 | 6/2005 |

* cited by examiner

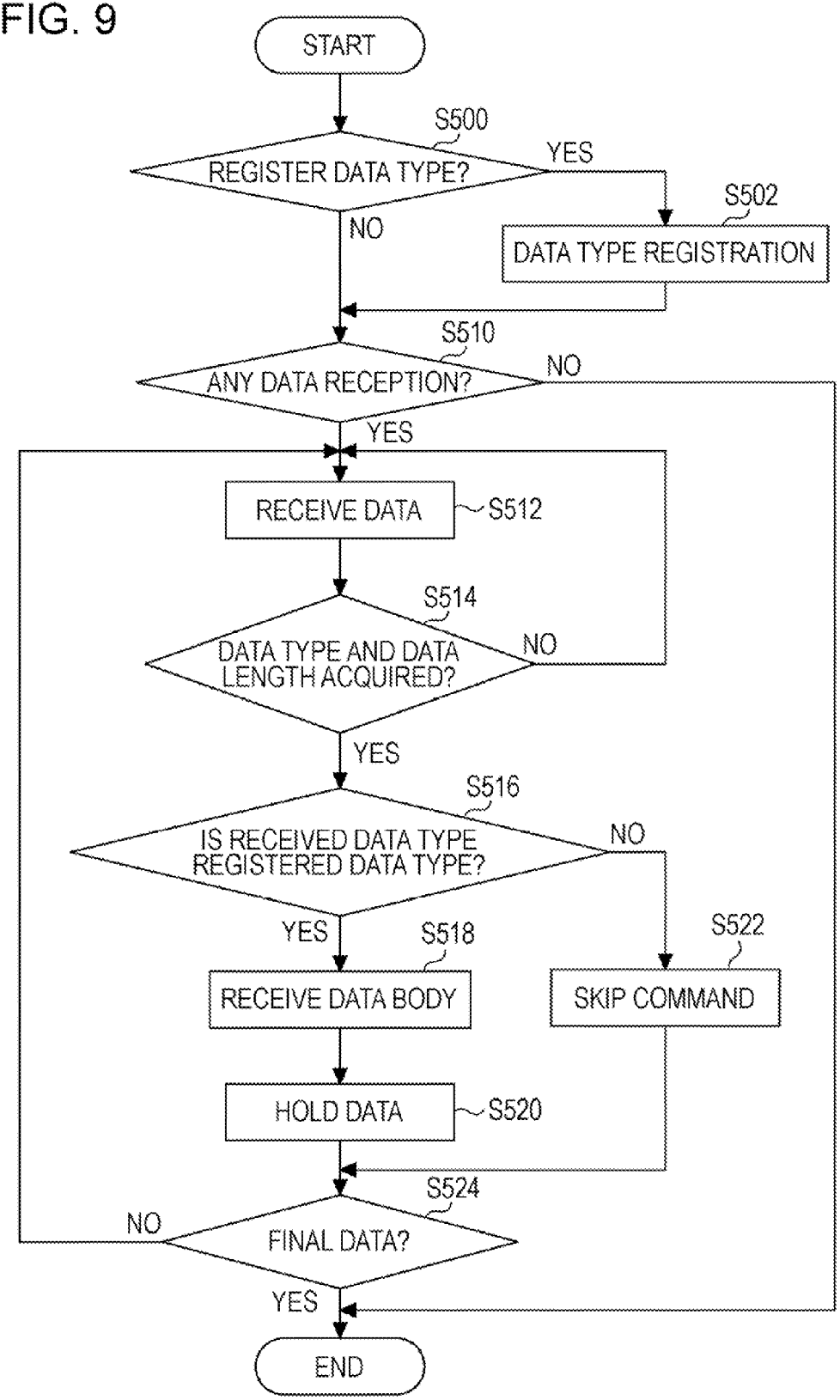

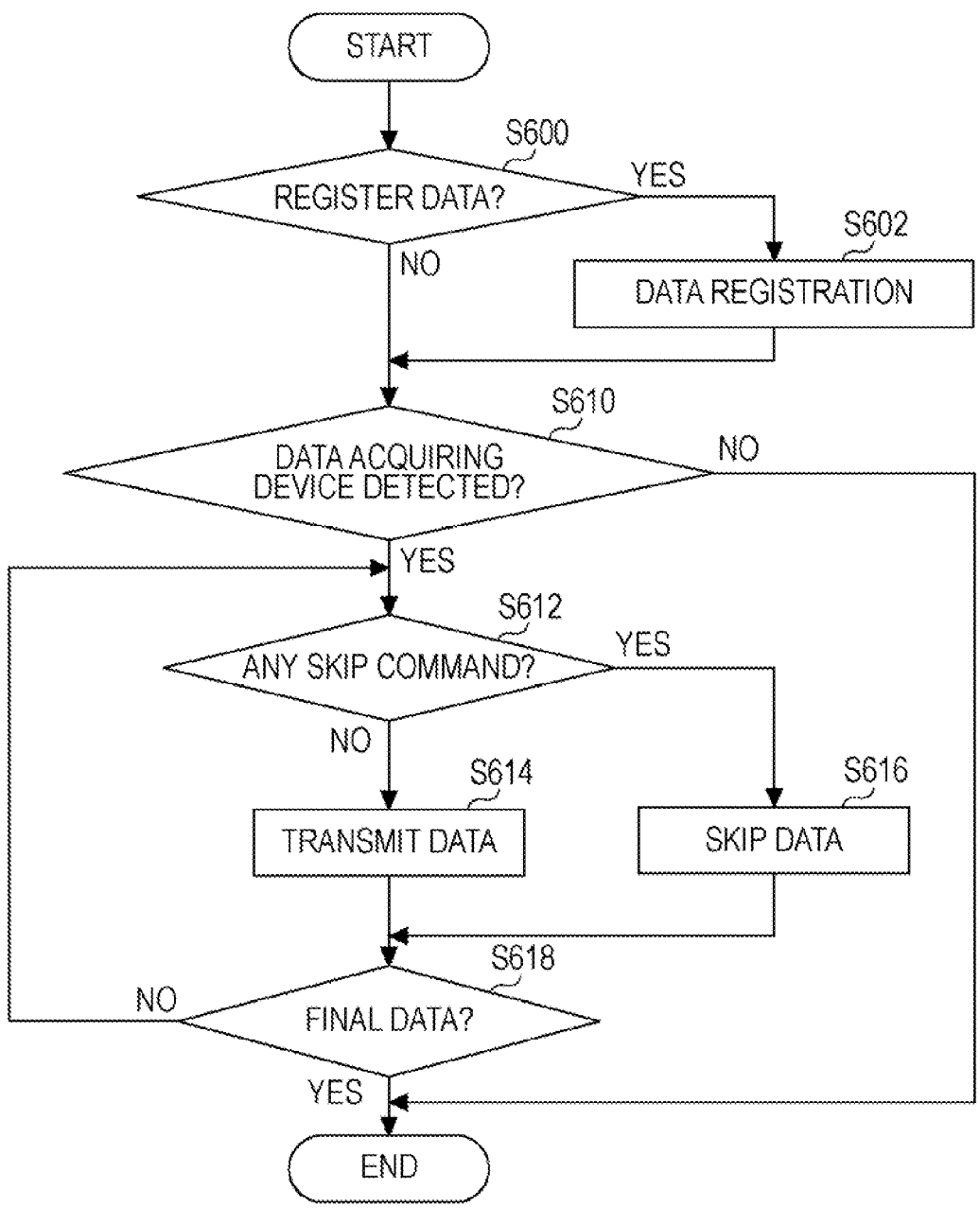

DATA TRANSFER SYSTEM, DATA ACQUISITION DEVICE, DATA ACQUISITION METHOD, DATA ACCUMULATION DEVICE, DATA TRANSMISSION METHOD, AND PROGRAM FOR THE SAME

CROSS REFERENCE TO RELATED APPLICATIONS

The present application claims priority to Japanese Patent Document No. P2005-208697 filed on Jul. 19, 2005, the disclosure of which is herein incorporated by reference.

TECHNICAL FIELD

The present invention relates to a data transfer system, a data acquisition device, a data acquisition method, a data accumulation device, a data transmission method, and a program for the same, and particularly relates to a data transfer system, a data acquisition device, a data acquisition method, a data accumulation device, a data transmission method, and a program for the same, whereby processing efficiency of acquired data can be improved.

BACKGROUND ART

Nowadays, it has become quite commonplace to download various types of information from public communication networks such as the Internet to portable terminals such as cellular telephones and the like, and use the information. Further, an art wherein IC tags or IC cards are embedded in advertisement posters displayed in train stations and the like, and individuals hold portable terminals such as cellular telephones and the like up to the posters to obtain information relating to the poster, such as URLs or the like, with new processing being performed based on the information, is in an implementation stage (e.g., Japanese Unexamined Patent Application Publication No. 2001-160105).

Such IC tags and IC cards embedded in the posters are capable of non-contact wireless data communication, and are advantageous in that the external appearance of the posters is unaffected and that maintenance cost can be reduced.

In the past, processing procedures for acquiring information relating to a poster from an IC tag or an IC card embedded in the poster involved all of the data stored in the IC tag or IC card to being first read into the portable terminal, with processing by an application in the portable terminal starting only after all of the data is read in.

As of recent the amount of information to be acquired from IC tags and IC cards is tending to increase, due to the increase in the data storage capacity of memory. However, the communication standards used for acquiring the information cannot be easily changed as with memory capacity, and accordingly there is a problem arising that the amount of time over which the IC tag or IC card and the portable device are constrained is becoming longer.

Particularly, in the event that data saved in IC tags or IC cards in posters (so-called "smart posters") is great in size or includes multiple types of data, data which does not need to be acquired may be automatically acquired depending on the specifications of the portable terminal, and in the event that the communication speed for obtaining the data is slow, a considerable amount of time may be consumed for the data acquisition.

SUMMARY

The present invention has been made in light of the above-described problems regarding conventional data acquisition, and according to an embodiment of the present invention, there is provided a new and improved data transfer system, data acquisition device, data acquisition method, data accumulation device, data transmission method, and program for the same, capable of improving data processing efficiency by restricting saving or acquiring of unnecessary data.

With past communication standards such as described above, data processing is started after reading in all data, regardless of whether that data is necessary or unnecessary. With the present invention, the data type of the data is determined, and saving or acquiring of unnecessary data is avoided.

In order to solve the above problems, according to a perspective of the present invention, a data transfer system comprises: a data accumulation device for accumulating data; and a data acquisition device for acquiring data from the data accumulation device by wireless communication; the data accumulation device including an accumulation communication unit for performing wireless communication of data, an accumulation holding unit for holding data, and a data transmission unit for transmitting data held in the accumulation holding unit to the data acquisition device via the accumulation communication unit, in the event that the data acquisition device is within a communicable range; and the data acquisition device including an acquisition communication unit for performing wireless communication of data, a type registration unit wherein data types of necessary data are registered beforehand, a type comparison unit for comparing the data type of data received via the acquisition communication unit with data types registered in the type registration unit, a data extracting unit for extracting only data of which the data type matches, and an acquisition holding unit for holding the extracted data.

The data accumulation device includes IC tags and IC cards for advertisement posters, and the data acquisition device includes portable terminals such as cellular telephones. The data accumulation device detects that the data acquisition device is within a communicable range, and starts data transmission. The data acquisition device determines the necessity of data while acquiring the data, and generates new data from which unnecessary data has been removed.

In order to solve the above problems, according to another perspective of the present invention, a data acquisition device comprises: an acquisition communication unit for performing wireless communication of data with a data accumulation device in which data is accumulated; a type registration unit wherein data types of necessary data are registered beforehand; a type comparison unit for comparing the data type of data received via the acquisition communication unit with data types registered in the type registration unit; a data extracting unit for extracting only data of which the data type matches; and an acquisition holding unit for holding the extracted data.

According to such a configuration, whether or not certain received data is necessary can be determined based on the data type of the received data, and saving of necessary data alone can be realized. Accordingly, the efficiency of subsequent data processing can be improved.

The data acquisition device may further comprise a skip instruction unit for causing the data accumulation device to skip transmission of data of which the data type has been determined to not match at the type comparison unit, with communication of data of which the data type does not match not being performed.

According to such a configuration, unnecessary transmission related to unnecessary data from the data accumulation device can be restricted, and data can be efficiently received in a short time even in cases wherein the communication speed with the data accumulation device is slow.

The data may be structured of sub-data units distinguished by data type, with each sub-data unit being structured of data type, data length, and a data body, in that order; and with the data extracting unit removing the data body of the length indicated in the data length in the event that the data type does not match. The data type indicates data attributes, and the data length indicates the length of the data body belonging to that data type, in bytes or the like. The data length may be made longer than the actual data body, taking into consideration the fact that data may be added to the data body in the future.

According to such a configuration wherein the data length information is referred to, the length of unnecessary data can be accurately known, so unnecessary data can be removed without involving other processes which would waste time, resources, etc.

The type registration unit may be capable of registration of data types of unnecessary data, with the data extraction unit omitting from extraction only data of which the data type matches that of the unnecessary data.

With the above-described type registration unit, necessary data types are registered and data other than the registered data types have been deleted as unnecessary data. However, unknown data types and yet-to-be-created data types are not readily predicted for registration beforehand. Accordingly, the above configuration of the data acquisition device wherein unnecessary data types are registered enables necessary data to be acquired in a sure manner, without deleting necessary data as unnecessary.

The wireless communication may be performed using a Near Field Communication standard. Data accumulation devices which are the object of data acquisition are often exposed to the air as with advertisement posters, and accordingly non-contact wireless communication is effective. An example of such non-contact wireless communication which can be employed is NFC (Near Field Communication). The usable range of NFC is narrow, around 10 cm, and also has excellent security features, such as restricting the other party of communication by hand action.

The data may be sectioned into 16-byte blocks. For example, with the above-described NFC used for non-contact wireless communication, data units are structured of 16-byte blocks. This arrangement wherein the data is configured of greater block increments and more detailed individual byte increments enables the start point and end point of unnecessary data to be speedily and easily specified.

Also provided is a program which causes a computer to function as the above-described data acquisition device.

Further provided is a data acquisition method according to another embodiment of the present invention, for acquiring data by wireless communication from a data accumulation device in which data is accumulated using the above data acquisition device, the method comprising: a type registering step wherein data types of necessary data are registered beforehand; a data receiving step wherein data is received from the data accumulation device; a type comparing step wherein the data type of data received is compared with data types registered in the type registering step; a data extracting step wherein only data of which the data type matches is extracted; and a data holding step wherein the extracted data is held.

In order to solve the above problems, according to another perspective of the present invention, a data accumulation device comprises: an accumulation communication unit for performing wireless communication of data; an accumulation holding unit for holding data; a data transmission unit for transmitting data held in the accumulation holding unit to the data acquisition device via the accumulation communication unit, in the event that a data acquisition device for acquiring data from the data accumulation device is within a communicable range; and a skip execution unit for causing transmission of data of predetermined data types to be skipped, in response to instructions from the data acquisition device.

According to such a configuration of the data transmission unit, in the event that the data accumulation device and the data acquisition device are in a communicable range, following mutual authentication the data acquisition device can automatically extract data saved within the data accumulation device. Also, In the event that the data acquisition device has a skip instruction unit, unnecessary transmission of unnecessary data can be restricted in accordance with an instruction from the skip instruction unit (a skip instruction), and data can be efficiently received in a short time even in cases wherein the communication speed with the data accumulation device is slow.

The data may be structured of sub-data units distinguished by data type, with each sub-data unit being structured of data type, data length, and a data body, in that order; and with the skip execution unit causing the data body of the length indicated in the data length to be skipped for sub-data units belonging to predetermined data types, in response to instructions from the data acquisition device. This data length allows the length of unnecessary data to be accurately known, and so unnecessary data can be skipped without involving other processes which would waste time, resources, etc.

The wireless communication may be performed using a Near Field Communication standard. The usable range of Near Field Communication (NFC) is narrow, around 10 cm, and also has excellent security features, such as restricting the other party of communication by hand action.

The data may be sectioned into 16-byte blocks. This arrangement wherein the data is configured of greater block increments and more detailed individual byte increments enables the start point and end point of unnecessary data to be speedily and easily specified.

The data accumulation device may be an IC tag or may be an IC card.

Also provided is a program which causes a computer to function as the above-described data accumulation device.

Further provided is a data transmission method using the data accumulation device, the method comprising: a data registering step wherein data is registered beforehand; an object detecting step wherein detection is made of a data acquisition device for acquiring data being within a communicable range; a data transmitting step wherein data registered in the data registering is transmitted to the data acquisition device in the event that the data acquisition device is detected in the object detecting; and a skip executing step wherein transmission of data of predetermined types is skipped in response to instructions from the data acquisition device.

Also, the data acquisition device and the data accumulation device may be configured of a single device. Further, the accumulation holding unit of the data accumulation device and the acquisition holding unit of the data acquisition device may be separately provided so as to communicate via the Internet or the like, and the components of the data acquisition device may be provided dispersed among separate devices.

According to the present invention as described above, restricting unnecessary saving or acquiring of data enables the efficiency of data processing to be improved, regardless of the communication standard and the communication speed thereof.

Also, there is no need to change communication standards or increase communication speed in connection to increased data capacity of the data accumulation device, so costs related to such changes can be reduced.

Additional features and advantages of the present invention are described in, and will be apparent from, the following Detailed Description and the Figures.

BRIEF DESCRIPTION OF THE FIGURES

FIG. 9 is a flowchart illustrating the flow of a data acquisition method.

FIG. 10 is a flowchart illustrating the flow of a data transmission method.

DETAILED DESCRIPTION

Figure 1:
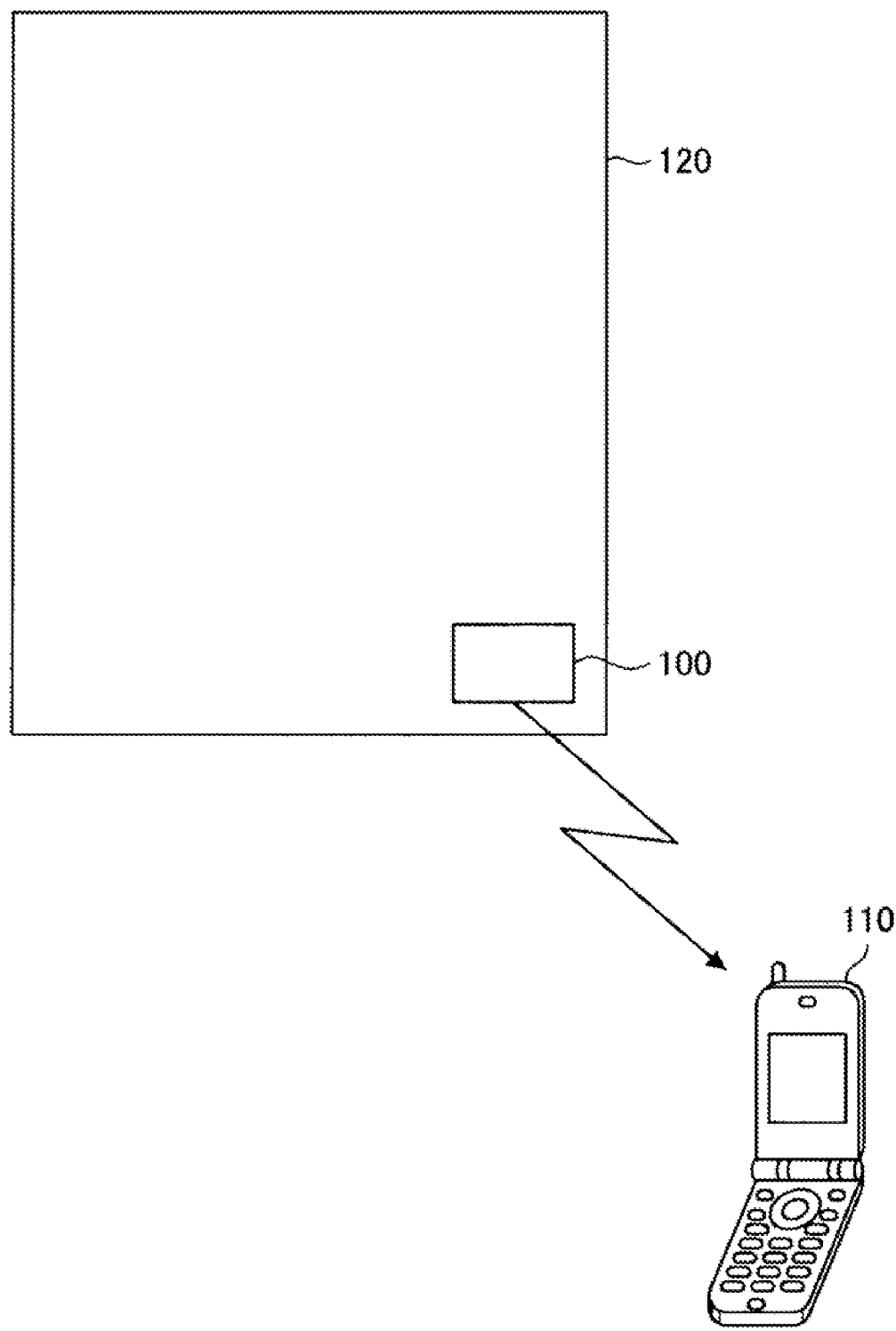
FIG. 1 is a block diagram illustrating the overall configuration of a data transfer system according to a first embodiment.

Preferred embodiments of the present invention will now be described in detail with reference to the attached drawings. Note that with regard to the present Specification and the drawings, components which have essentially the same functional configuration will be denoted with the same reference numerals, and redundant description thereof will be omitted.

For example, in the event of obtaining URLs or map information or the like related to the contents of an advertisement poster displayed in a train station or the like, the information can be downloaded without contact simply by holding a portable terminal such as a cellular telephone or the like up to an IC tag or IC card embedded in the poster.

An example of such non-contact wireless communication which can be employed is NFC (Near Field Communication). The usable range of NFC is narrow, around 10 cm, and also has excellent security features, such as restricting the other party of communication by hand action. The advertisement poster in which an IC tag or IC card is embedded, which are the object of data acquisition, are often exposed to the air, and accordingly non-contact wireless communication is effective.

FIRST EMBODIMENT

Data Transfer System

FIG. 1 is a block diagram illustrating the overall configuration of a data transfer system according to a first embodiment. This data transfer system includes a data accumulation device 100 in which data is accumulated, and a data acquisition device 110 for acquiring data from the data accumulation device wirelessly.

The data accumulation device 100 detects that the data acquisition device 110 is within a communicable range, and starts data transmission. The data acquisition device 110 acquires the data, and accordingly can make reference to the data, and acquire new service by additional processing.

The data accumulation device 100 is placed in a tangible entity 120 such as a poster or the like. The tangible entity 120 includes public objects such as advertisements, posters, bulletins, signs, and so forth, and can be used for giving users some sort of information. The IC tags or IC cards serving as data accumulation devices 100 which are placed in such tangible entities 120 may be configured without independent power sources, so as to operate by receiving electric power supply from other electronic devices wirelessly.

The data acquisition device 110 is provided separately from the above data accumulation device 100, and is carried out in the form of a cellular telephone, PDA (Personal Digital Assistant), mobile personal computer, wristwatch, calculator, mouse, or the like, which can be transported by the user.

The manager of the tangible entity 120 which is a poster or the like writes information relating to the contents of the poster (URL, general information, detailed information, map information, fees, date-and-time, etc.) to the IC tag serving as the data accumulation device 100, either at the time of putting up the poster, or beforehand. In the event that a user is interested in the contents of the poster, the user brings the data acquisition device 110 close to the IC tag of the poster in order to record the contents of the poster or to obtain new information, and accordingly downloading is started by simple operations.

For obtaining information related to the poster from the data accumulation device 100 embedded in the poster, processing procedures which have been employed in the past involved first reading all of the data saved in the data accumulation device 100 into the portable terminal, and then starting processing with applications in the portable terminal. However, in recent years, the amount of information to be acquired has increased to more than 10 KB for example, but the wireless communication speed such as 212 Kbps for example cannot be changed, so the amount of time over which the devices are restricted for information acquisition has been increasing. Accordingly, with NFC, the data acquisition device 110 must be kept held up to the data accumulation device 100 as long as it takes to complete the wireless communication.

With such a communication standard, in the event that the data accumulation device 100 has data of a great size and multiple types, data which does not need to be transmitted may be automatically transmitted depending on the specifications of the data acquisition device 110, and in the event that the communication speed for obtaining the data is slow, a considerable amount of time may be consumed for the data acquisition.

Figure 2:
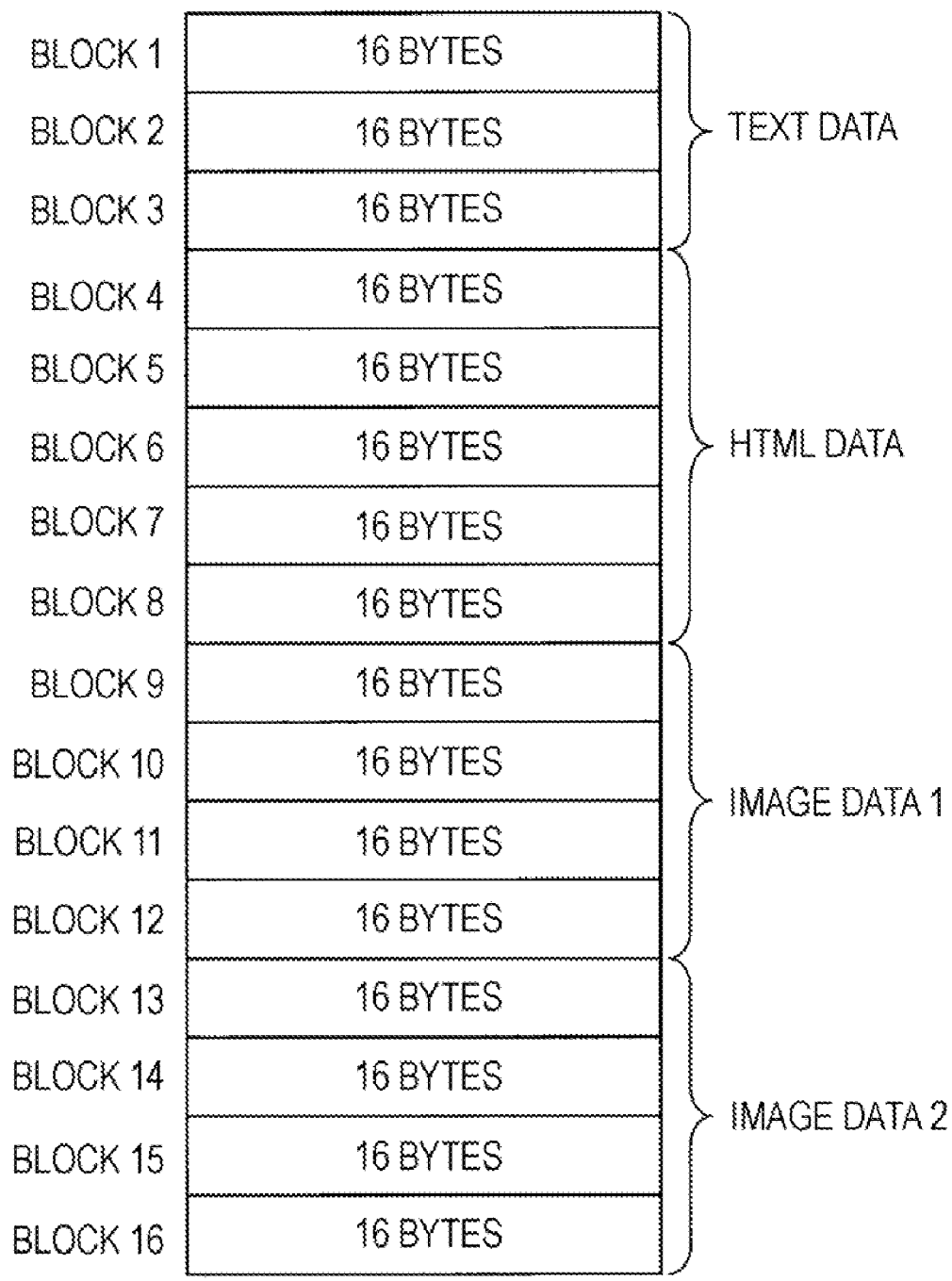
FIG. 2 is an explanatory diagram for describing the configuration of data saved by a data accumulation device.

FIG. 2 is an explanatory diagram for describing the configuration of data saved in the data accumulation device 100. Looking at FIG. 2, the data is sectioned into 16-byte blocks. The above-described NFC exchanges data in the 16-byte blocks.

For example, in the example shown in FIG. 2, text data is stored in blocks 1 through 3, HTML data in blocks 4 through 8, image data 1 in blocks 9 through 12, and image data 2 in blocks 13 through 16. While the block sectioning and the sectioning between different types of data are illustrated in a matching manner to facilitate understanding, NFC is not restricted to this, and sectioning of different types of data may exist within a block.

Now, the text data is used by a data acquisition device 110 capable of handling text, and the HTML data, image data 1, and image data 2, are used by an HTML-compatible data acquisition device 110.

In other words, with a text-based data acquisition device 110, only the text data is necessary here, and the remaining HTML data, image data 1, and image data 2 are unnecessary. On the other hand, with an HTML-compatible data acquisition device 110, the HTML data, image data 1, and image data 2 are the necessary data, and the text data is the unnecessary data.

With such past communication standards, data processing is started only after all of the data is read in, regardless of whether the data is necessary or unnecessary. With an embodiment according to the present invention, the data type of the data being received in 16-byte increments is determined, and accordingly saving or acquiring of unnecessary data can be avoided.

The data acquisition device 110 and data accumulation device 100 making up the data transfer system will be described in detail below.

SECOND EMBODIMENT

Data Acquisition Device 110

Figure 3:
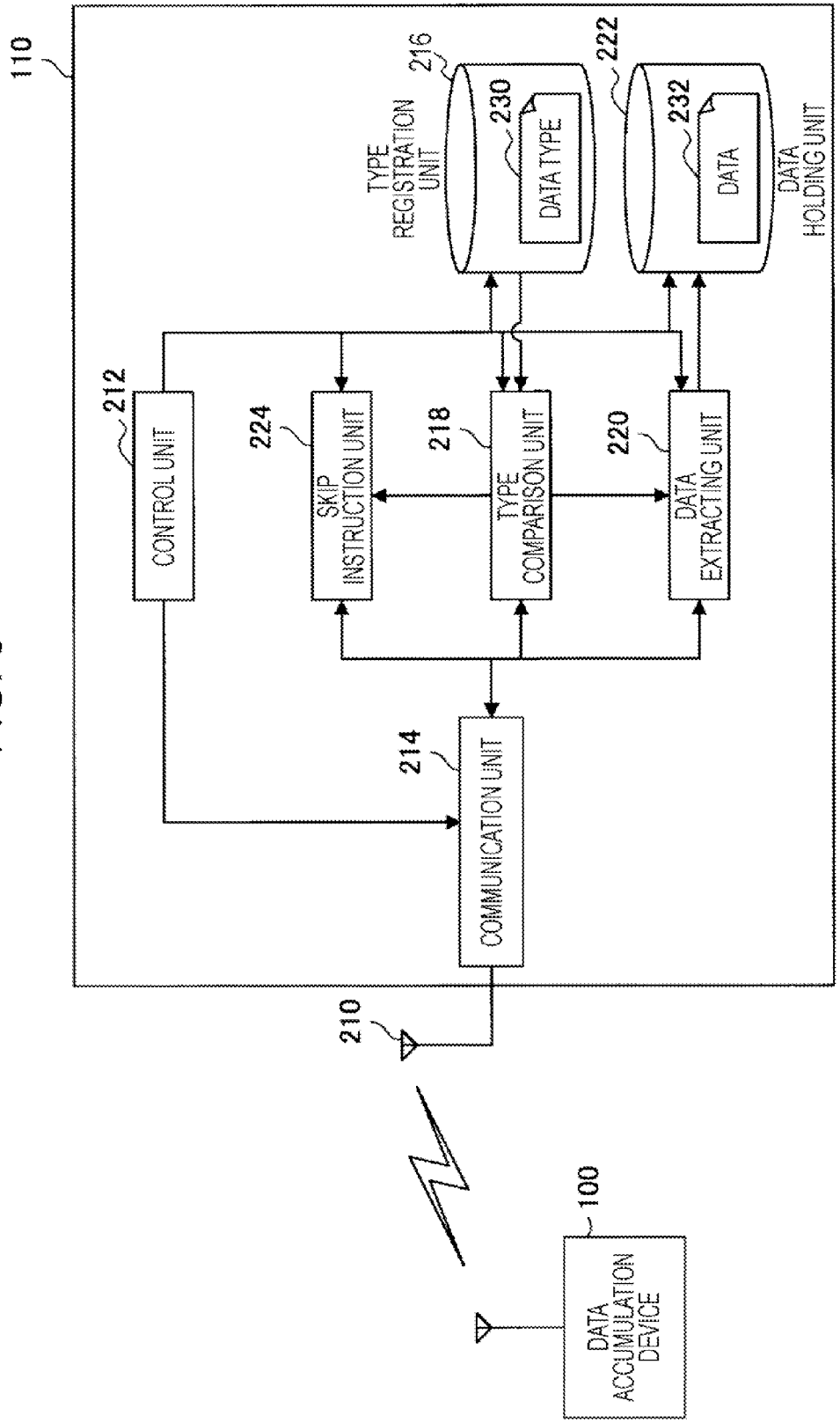
FIG. 3 is a block diagram illustrating the overall configuration of a data acquisition device according to a second embodiment.

FIG. 3 is a block diagram illustrating the overall configuration of the data acquisition device 110 according to a second embodiment. The data acquisition device 110 is configured including an antenna 210, a control unit 212, a communication unit 214, a type registration unit 216, a type comparison unit 218, a data extracting unit 220, a data holding unit 222, and a skip instruction unit 224.

The antenna 210 has at least a communication band capable of the above-described NFC wireless communication, and may be formed as a loop antenna, for example.

The control unit 212 manages and controls the overall data acquisition device 110 by a semiconductor integrated circuit including a CPU (Central Processing Unit).

The communication unit 214 performs wireless communication of data with the data accumulation unit 100. The communication unit 214 is configured of, for example, an RF circuit, modulation/demodulation circuit, encoder, decoder, and so forth.

The type registration unit 216 has registered therein data type 230, for data necessary due to restrictions in processing capabilities of the data acquisition device 110, or data which the user of the data acquisition device 110 needs, such as "text data", for example. This registration may be made by the data acquisition device 110 upon determining its own processing capabilities, or may be registered by the user of the data acquisition device 110.

Also, the type registration unit 216 may have registered therein data types of unnecessary data, separate from a configuration wherein data types of necessary data are registered. With a configuration wherein necessary data types are registered in the type registration unit 216 and data of types other than those data types are deleted as unnecessary data, there is the problem that predicting and registering unknown data types and yet-to-be-created data types so as to not be deleted is unrealistic. Accordingly, registering unnecessary data types in the data acquisition device 110 enables necessary data to be acquired in a sure manner, without deleting necessary data as unnecessary.

Further, the type registration unit 216 may have registered therein both necessary data types and unnecessary data types. With such an arranging, in the event that a data type is encountered which does not belong to either, the user may confirm the data type, and register the data type as being either necessary or unnecessary again.

The type comparison unit 218 compares the data type of the data received via the communication unit 214 (sub-data) with the data types registered in the type registration unit 216. Due to such a configuration, whether or not data (sub-data) received is necessary data can be determined from the data type.

The data extracting unit 220 extracts only data regarding which the data type has matched at the type comparison unit 218. Also, in the event that unnecessary data types are registered in the type comparison unit 218, the data extraction unit 220 does not extract data regarding which the data type of unnecessary data matches.

The data received from the data accumulation device 100 is structured of sub-data units distinguished by data type, and each sub-data unit is structured of data type and data length serving as data header information, followed by a data body, in that order.

Figure 4:
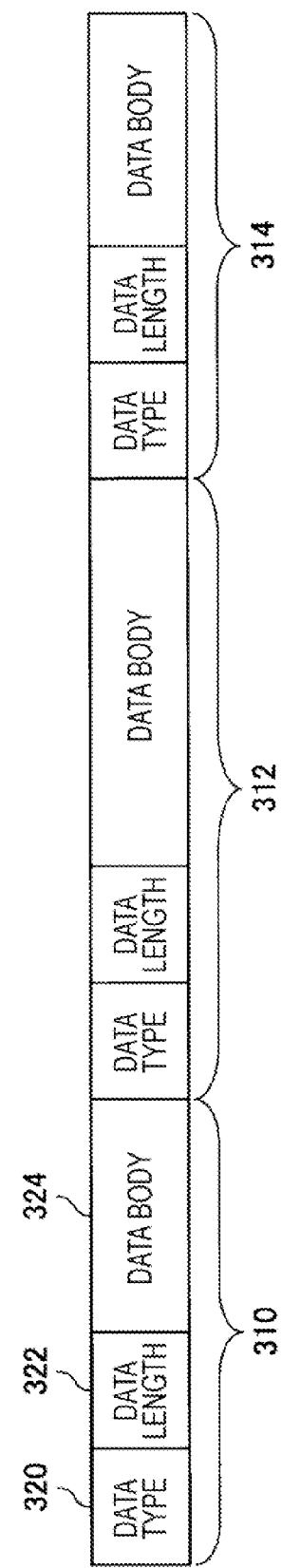
FIG. 4 is a data configuration diagram for describing data configuration.

FIG. 4 is a data configuration diagram for describing this data configuration. In FIG. 4, we see that the sub-data 310, 312, and 314, which can be recognized as data types, each have data type, data length, and data body, in that order. The data type 320 in the sub-data 310 indicates data attributes, such as "text data", "HTML data", "image data", "audio data", and so forth, and the data length 322 indicates the byte length of the data body 324 belonging to that data type 320. The maximum length of the data length section of the header information may be 4 bytes.

The data length 322 may be made longer than the actual data body 324, taking into consideration the fact that data may be added to the data body 324 in the future, so that for example, in the event that the data body 324 is 20 bytes in length, the data length 322 may be set to 50 bytes, so as to set the difference of 30 bytes as a reserved region.

The data extracting unit 220 skips extracting of the data body 324 for the number of bytes listed in the data length 322 in the event that determination is made at the type comparison unit 218 that the data type does not match. Consequently, this configuration wherein the data length 322 is referred to allows an accurate understanding of how far the unnecessary data goes, enables determination of what data types are included in each received block, and so forth, thereby enabling unnecessary data to be efficiently removed without involving other processes which would waste time, resources, etc.

The data received from the data accumulation device 100 may be sectioned into 16-byte blocks. For example, with the above-described NFC used for non-contact wireless communication, data units are structured of 16-byte blocks, as described with reference to FIG. 2. This arrangement wherein the data is configured of greater block increments and more detailed individual byte increments enables the start point and end point of unnecessary data to be speedily and easily specified.

The data holding unit 222 holds the data 232 extracted by the data extracting unit 220. Such a configuration where only the necessary data 232 is saved enables the efficiency of subsequent data processing to be improved.

A user having the data acquisition device 110 can freely read the data 232, and can perform further processing, such as finding out the geographical location of a target location from a URL included in the read data (content) 232, for example.

The skip instruction unit 224 causes the data accumulation device 100 to skip transmission of data regarding which the data type did not match at the type comparison unit 218. For example, with the above-described NFC used for non-contact wireless communication, data is transmitted in 16-byte units. In the event that an unnecessary data block is encountered at the time of communication confirmation, the skip instruction unit 224 transmits an instruction to the data accumulation device 100, to the effect to stop transmission of the unnecessary data block.

Figure 5:
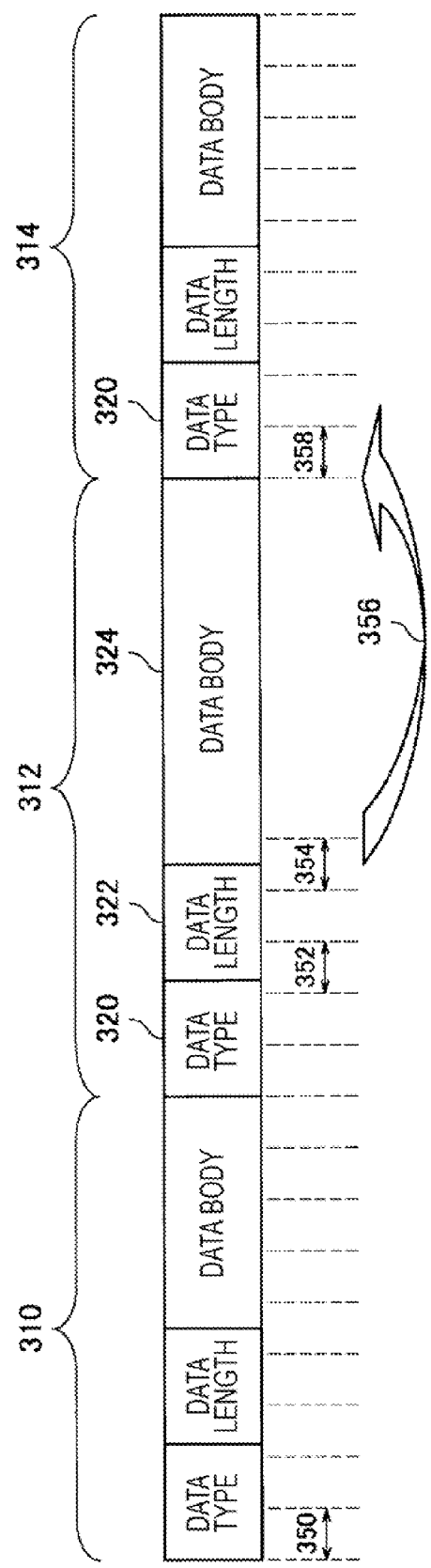
FIG. 5 is a data configuration diagram for describing skipping of transmission at the data accumulation device.

FIG. 5 is a configuration diagram for describing skipping of transmission from the data accumulation device 100. As described with reference to FIG. 4, the data transmitted from the data accumulation device 100 is divided into sub-data units 310, 312, and 314, each having header information of data type 320 and data length 322, and data body 324, which can be recognized as data types, in that order. Also, besides the above-described structure, the data is divided into 16-byte blocks 350. Accordingly, the type comparison unit 218 receives the 16-byte blocks, connects these with already-received blocks, and determines the data type and so forth.

The type comparison unit 218 reads in the data up to block 352, compares the data type 320 of the sub-data 312 with the data type 230 registered in the type registration unit 216, and finds out that the data body 324 of the sub-data 312 is unnecessary. The type comparison unit 218 further reads in blocks, and upon reading in block 354 knows the length (byte length) of the unnecessary data body 324 from the data length 322. The skip instruction unit 224 transmits to the data accumulation device 100 the number of blocks regarding which transmission needs to be omitted, or a block number indicating the same, such that the blocks representing the data body 324 are skipped.

Accordingly, transmission of blocks of that portion is stopped as indicated by the arrow 356 shown in FIG. 5, and transmission is resumed from the block 358 including the data type 320 for the subsequent sub-data 314.

With such a configuration, unnecessary transmission related to unnecessary data from the data accumulation device 100 can be restricted, and data can be efficiently received in a short time even in cases wherein the communication speed with the data accumulation device 100 is slow.

Now, an arrangement may be made wherein, in the event that the data accumulation device 100 is of a conventionally-used type without a data format of data type, data length, and data body such as described above, the type comparison unit 218 recognizes this fact and simply reads in the data in sequential order, without any change to the data.

Also provided is a program which causes a computer to function as the data acquisition device, and a recording medium storing the program.

(Embodiment of Specific Circuit Configuration)

Figure 6:
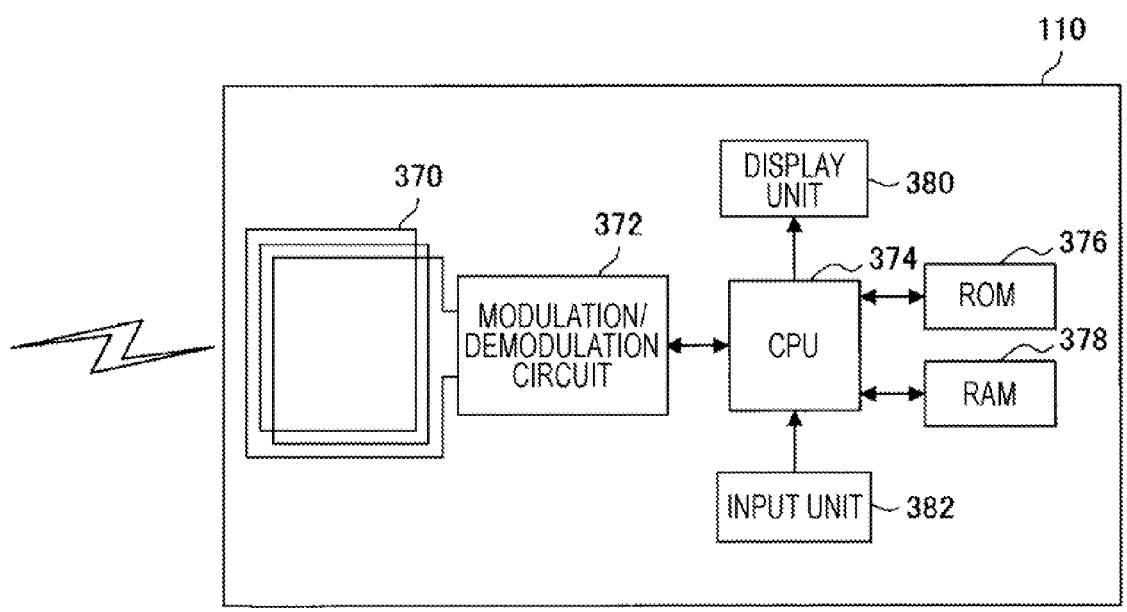
FIG. 6 is a circuit block diagram illustrating the overall configuration of a data acquisition device 110 according to the second embodiment.

FIG. 6 is a circuit block diagram illustrating the overall configuration of the data acquisition device 110 according to the second embodiment. The above-described data acquisition device 110 is illustrated with a more specific circuit here.

The data acquisition device 110 includes a loop antenna 370, a modulation/demodulation circuit 372, a CPU 374, ROM 376, RAM 378, a display unit 380, and an input unit 382.

The loop antenna 370 forms multiple loops, for improving reception sensitivity in a small space, thereby enabling the NFC communication band.

The modulation/demodulation circuit 372 modulates data to be transmitted to the data accumulation device 100 according to NFC, and also demodulates modulation waves from the data accumulation device 100 into data.

The CPU 374 is a semiconductor integrated circuit for performing signal processing, managing, and controlling of the overall data acquisition device 110. The ROM 376 stores beforehand programs for controlling the data acquisition device 110, to be read to the CPU 374. The RAM 378 is used as area for temporarily storing certain data for the CPU 374 to function as the data acquisition device 110, for storing variables, and so forth.

The display unit 380 is a monochrome or color display for displaying data read from the data accumulation device 100. The input unit 382 is configured of a key input unit (not shown) such as a keyboard, numeric keypad, or the like, for supporting the display functions of the display unit 380 and also for use in selection of data types.

THIRD EMBODIMENT

Data Accumulation Device 100

Figure 7:
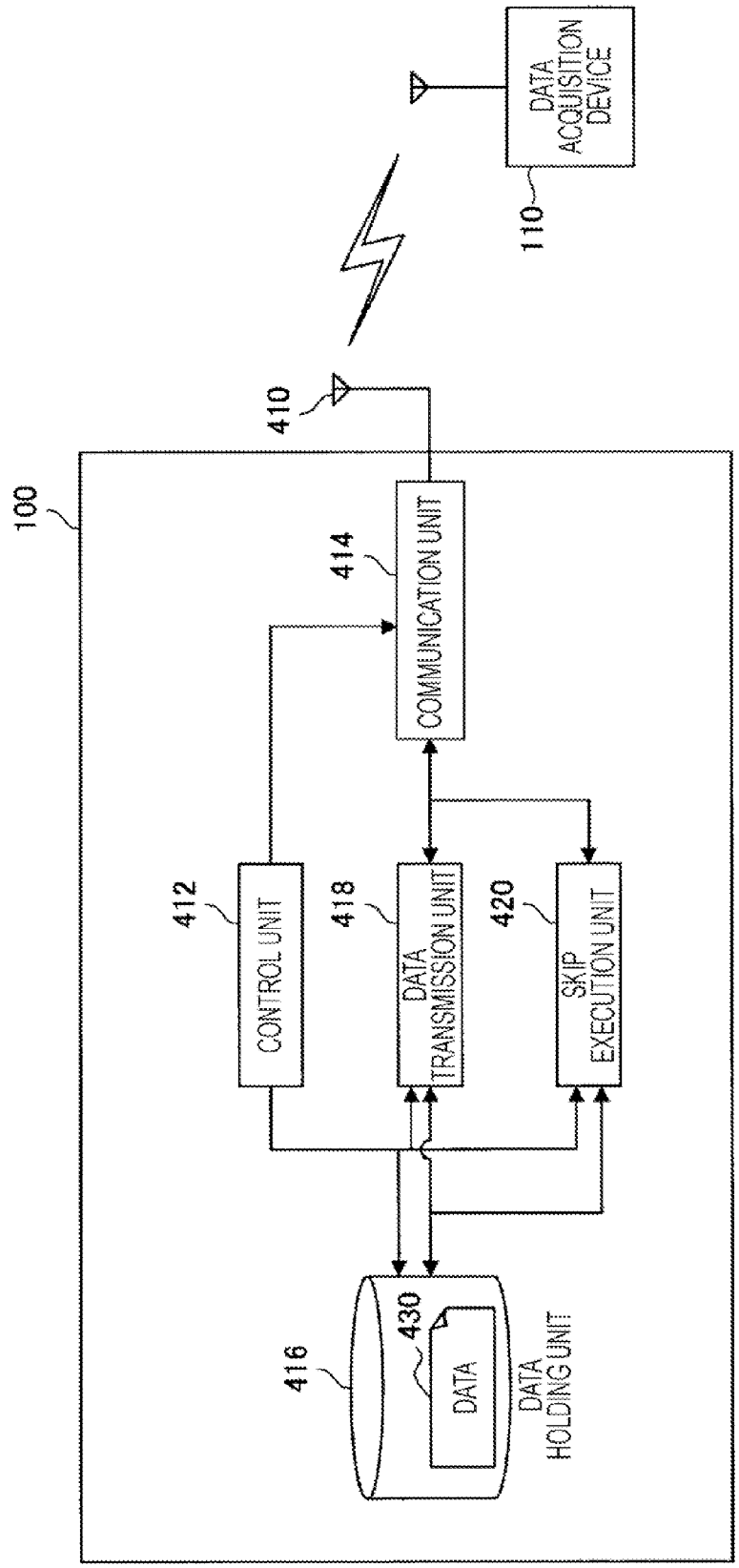
FIG. 7 is a block diagram illustrating the overall configuration of a data accumulation device according to a third embodiment.

FIG. 7 is a block diagram illustrating the overall configuration of the data accumulation device 100 according to a third embodiment. The data accumulation device 100 is configured including an antenna 410, a control unit 412, a communication unit 414, a data holding unit 416, a data transmission unit 418, and a skip execution unit 420.

The antenna 410 has at least a communication band capable of NFC wireless communication, and may be formed as a loop antenna, for example.

The control unit 412 manages and controls the overall data accumulation device 100 by a semiconductor integrated circuit including a CPU (Central Processing Unit).

The communication unit 414 performs wireless communication of data with the data acquisition unit 110. The communication unit 414 is configured of, for example, an RF circuit, modulation/demodulation circuit, encoder, decoder, and so forth, for example.

The data holding unit 416 converts information which the user desires into a data format which the user can refer to. Referring to this data enables the user to obtain URLs and map information relating to the contents of an advertisement poster, for example.

In the event that the data acquisition device 110 is within a communicable range, e.g., in the event that the wireless communication method used is NFC and the data acquisition device 110 is within around 10 cm of the data accumulation device 100, the data transmission unit 418 transmits the data stored in the data holding unit 416 to the data acquisition device 110 via the communication unit 414. An arrangement may be made wherein, in the event that a data acquisition device 110 is automatically detected within the communicable range, communication between the data accumulation device 100 and the data acquisition device 110 is automatically started following mutual authentication.

As described above with the second embodiment, sub-data sectioned by data types each have data type, data length, and data body, in that order. This configuration including the data length allows an accurate understanding of how far the unnecessary data goes, thereby enabling unnecessary data to be efficiently skipped without involving other processes which would waste time, resources, etc.

The skip execution unit 420 skips transmission of predetermined data types (data body) in response to skip instructions from the skip instruction unit 224 of the data acquisition unit 110. Also, the skip execution unit 420 may be arranged to skip data body of a length indicated in the data length belonging to a certain data type, in response to instructions from the data acquisition device 110. This skipping of data has already been described with reference to FIG. 5 in the second embodiment, so description thereof will be omitted here.

In the event that the data acquisition device 110 which is the communication object has a skip instruction unit 224, unnecessary transmission of unnecessary data can be restricted in accordance with instructions from the skip instruction unit 224, and data can be efficiently received in a short time even in cases wherein the communication speed with the data acquisition device 110 is slow.

The data accumulation device may be a non-contact IC tag or IC card provided on a poster or the like. This does away with the need to have a conspicuous-looking electronic device provided on the poster, thereby improving the external appearance of the poster. Further, no electric power source is required, so maintenance costs can also be reduced.

Also provided is a program which causes a computer to function as the data accumulation device, and a recording medium storing the program.

(Embodiment of Specific Circuit Configuration)

Figure 8:
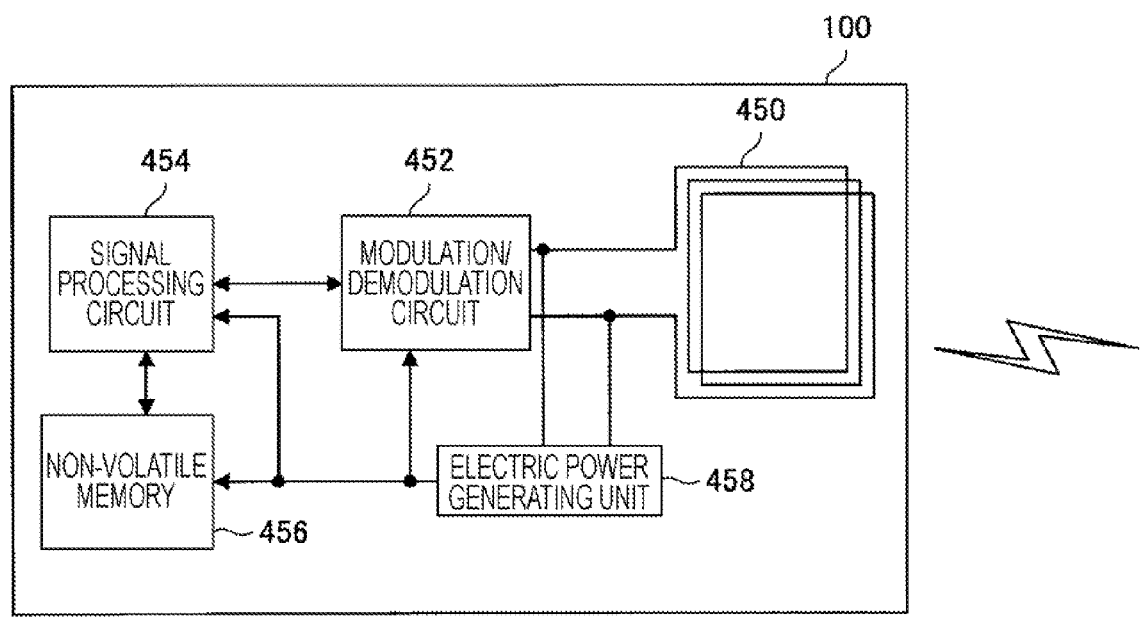
FIG. 8 is a circuit block diagram illustrating the overall configuration of the data accumulation device according to the third embodiment.

FIG. 8 is a circuit block diagram illustrating the overall configuration of the data accumulation device 100 according to the third embodiment. The above-described data accumulation device 100 is illustrated with a more specific circuit here.

The data accumulation device 100 includes a loop antenna 450, a modulation/demodulation circuit 452, a signal processing circuit 454, non-volatile memory 456, and an electric power generating unit 458.

The loop antenna 450 forms multiple loops, for improving reception sensitivity even in a small space, thereby enabling the NFC communication band. Depending on the communication standard and carrier wave frequency used, an antenna built into the IC chip may suffice without necessitating use of the loop antenna 450.

The modulation/demodulation circuit 452 modulates data to be transmitted to the data acquisition device 110 according to NFC, and also demodulates modulation waves from the data acquisition device 110 into data.

The signal processing circuit 454 is a semiconductor integrated circuit for performing signal processing, managing, and controlling of the overall data accumulation device 100. The non-volatile memory 456 serves as both ROM and RAM, and the stored contents are not erased even when the power is off. Accordingly, in the event that the manager of the data accumulation device 100 rewrites the data and then the data accumulation device 100 is left in a powerless state, the data is still preserved.

The electric power generating unit 458 converts electric waves from the data acquisition device 110 into electric power as long as communication with the data acquisition device 110 is maintained, and supplies the power to the modulation/demodulation circuit 452, signal processing circuit 454, and non-volatile memory 456. Thus, the electric power generating unit 458 must supply power to the circuits from a limited source of electric waves, so low-power-consumption devices are used for the circuits as much as possible.

Further, the data acquisition device 110 and the data accumulation device 100 may be configured of a single device. Further, the data holding unit 416 of the data accumulation device 100 and the data holding unit 222 of the data acquisition device 110 may be separately provided so as to communicate via the Internet or the like, and the components of the data acquisition device 110 may be provided dispersed among separate devices.

FOURTH EMBODIMENT

Data Acquisition Method

Next, a data acquisition method for acquiring data from the data accumulation device 100 by wireless communication using the data acquisition device 110 will be described.

FIG. 9 is a flowchart illustrating the flow of the data acquisition method.

In order to extract only data of certain types from the received data, first, data type registration is performed. The data acquisition device 110 determines whether or not to register a data type as data necessary due to processing capabilities of the data acquisition device 110 or data which the user of the data acquisition device 110 needs (S500). In the event that determination is made there that registration of the data type is necessary, e.g., in the event that the user opts for registration of data type, data type registration is performed (S502)

Data types include "name of event", "location", "dates", "map data", "address", "telephone number", and "fax number", from which selection can be made, and in the event that the user registers the data types of "dates" and "telephone number", the user can hold the data acquisition device 110 up to a poster carrying concert information for example, and obtain the data and telephone numbers for that concert.

Holding the data acquisition device 110 up to the data accumulation device 100 starts communication between the two, and an arrangement may be made wherein the user can know that communication has started by notification using audio, LEDs, vibrations, and so forth. Now, whether or not there is reception data is confirmed (S510), and in the event that reception data exists, the data is received (S512), otherwise, the present data acquisition method ends.

The data is configured of multiple sub-data units, each sub-data unit being structured of data type, data length, and a data body. The data acquisition device 110 repeats the data reception step (S512) until the data type and data length are acquired (S514).

Upon the data type and data length having been acquired, the data acquisition device 110 compares the data type (reception data type) received from the data accumulation device 100 with the data type (registered data type) registered in the type registration step (S502) in step S516, and in the event that the data types match, the data body following the data length is received (S518), and the received extracted data is held in the data holding unit 222 (S520). Otherwise, the number of blocks which can be skipped is calculated from the data length, and a skip instruction is issued to the data accumulation device 100 to skip transmission of the data body following the data length (S522).

Next, determination is made regarding whether or not the data (sub-data) processing in this way is the final data (S524), and in the event that this is not the final data, the flow is repeated from the data reception step (S512). If this is the final data, the present data acquisition method ends. An arrangement may be made wherein the user of the data acquisition device 110 is notified of ending of data acquisition by audio, LEDs, vibrations, or the like, from either the data acquisition device 110 or the data accumulation device 100.

FIFTH EMBODIMENT

Data Transmission Method

Next, a data transmission method for wirelessly transmitting data to the data acquisition device 110 using the data accumulation device 100 will be described.

FIG. 10 is a flowchart illustrating the flow of the data transmission method.

The data accumulation device 100 provides various types of information to the data acquisition device 110 as data. Accordingly, registration of data having such information is performed first. The data accumulation device 100 determines whether or not certain data is data to be registered to the data accumulation device 100 (S600). In the event that determination is made that data registration is necessary, the manager of the data accumulation device 100 performs registration of data using a password or the like, for example (S602).

Next, determination is made regarding whether or not the data acquisition device 110 is within communicable range of the data accumulation device 100 (S610). In the event that the data acquisition device 110 is detected in this object detection step (S610), preparation to transmit the data registered in the data registration step (S602) to the data acquisition device 110 is started. If no data acquisition device 110 is detected in the communicable range of the data accumulation device 100, the detection action (polling) is continued until the data acquisition device 110 is detected within the communicable range.

Subsequently, the data accumulation device 100 confirms whether or not there has been a skip instruction from the data acquisition device 110 (S612), and continues to transmit the registered data unless there has been a skip instruction (S614). Also, in the event that there has been a skip instruction from the data acquisition device 110, the data is skipped from the instructed number of blocks (S616), and transmission is resumed from the block including the next data type.

Next, determination is made regarding whether or not the data (sub-data) processed as described above is the final data (S618), and in the event that the data is not the final data, the flow is repeated from confirmation of the skip command (S612), otherwise, the present data transmission method ends.

According to the data acquisition method and data transmission method, saving or acquisition of unnecessary data can be restricted, and efficiency of data processing can be improved regardless of the communication standard and the communication speed thereof.

Now, while preferred embodiments of the present invention have been described with reference to the attached drawings, it is clearly understood that the present invention is not restricted by these examples. It should be understood by those skilled in the art that various modifications, combinations, sub-combinations and alterations may occur depending on design requirements and other factors insofar as they are within the scope of the appended claims or the equivalents thereof.

For example, with the above-described data acquisition method and data transmission method, a configuration wherein both the data type and data length are acquired by the data acquisition device before the data type is determined, but the present invention is not restricted to this configuration, and an arrangement may be made for example, wherein the data acquisition device issues a skip instruction to the data accumulation device based on determination of the data type alone, and the data accumulation device determines the length of the data body to be skipped form the data length, so as to start transmission from the next data type.

Also, the above-described embodiments involve non-contact wireless communication between the data acquisition device and the data accumulation device, but the present invention is not restricted to this configuration, rather, communication may be performed via cable or wirelessly, or by contact or non-contact.

It should be further noted that the steps of the data acquisition method and data transmission method in the present Specification are not restricted to being carried out in the time-sequence described in the flowcharts, and may be executed in parallel or individually (e.g., parallel processing or object-based processing).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A communication system for transferring data, the communication system comprising:
  a data accumulation device for accumulating data, said data including:
    (a) a first sub-data including:
      (i) a first data type;
      (ii) a first number; and
      (iii) a first data body having a first size indicated by said first number;
    (b) a second sub-data including:
      (i) a second data type;
      (ii) a second number; and
      (iii) a second data body having a second size indicated by said second number; and
  a data acquisition device for acquiring said data from said data accumulation device by wireless communication;
  said data accumulation device including:
    (a) a first wireless communication unit for performing wireless communication of said data;
    (b) a first data holding unit for holding said data; and
    (c) a data transmission unit for transmitting said data held in said first data holding unit to said data acquisition device via said first wireless communication unit, in the event that said data acquisition device is within a communicable range; and
  said data acquisition device including:
    (a) a second wireless communication unit for performing wireless communication of said data;
    (b) a type registration unit wherein:
      (i) a third data type which includes a first necessary data is registered beforehand; and
      (ii) a fourth data type which includes a second necessary data is registered beforehand;
    (c) a type comparison unit for:
      (i) when the first data type of the first sub-data is received via said second wireless communication unit from said data accumulation device, determining whether the first data type matches at least one of said registered third data type and registered fourth data type by comparing the first data type of the first sub-data with:
(A) said registered third data type which includes said first necessary data; and
(B) said registered fourth data type which includes said second necessary data; and
(ii) when the second data type of the second sub-data is received via said second wireless communication unit from said data accumulation device, determining whether the second data type matches at least one of said registered third data type and registered fourth data type by comparing the second data type of the second sub-data with:
(A) said registered third data type which includes said first necessary data; and
(B) said registered fourth data type which includes said second necessary data;
(d) a data extracting unit configured to:
(i) if said compared first data type matches at least one of said registered third data type and said registered fourth data type, extract said first data body;
(ii) if said compared second data type matches at least one of said registered third data type and said registered fourth data type, extract said second data body;
(iii) if said compared first data type does not match said registered third data type and said registered fourth data type, skip extraction of said first data body based on said first number which indicates said first size of said first data body included in said first sub-data; and
(iv) if said compared second data type does not match said registered third data type and said registered fourth data type, skip extraction of said second data body based on said second number which indicates said second size of said second data body included in said second sub-data;
(e) a skip instruction unit configured to:
(i) if the determination is the first data type does not match said registered third data type and registered fourth data type, transmit the first number to the data accumulation device, said data accumulation device being configured to, using said first number transmitted by the skip instruction unit, skip transmission of said first data body; and
(ii) if the determination is the second data type does not match said registered third data type and registered fourth data type, transmit the second number to the data accumulation device, said data accumulation device being configured to, using said second number transmitted by the skip instruction unit, skip transmission of said second data body; and
(f) a second data holding unit for holding said extracted data.

2. A data acquisition device comprising:
a wireless communication unit for performing wireless communication of data with a data accumulation device in which data is accumulated, wherein said accumulated data includes:
(a) a first sub-data including:
(i) a first data type;
(ii) a first number; and
(iii) a first data body having a first size indicated by said first number; and (b) a second sub-data including:
(i) a second data type;
(ii) a second number; and
(iii) a second data body having a second size indicated by said second number;
a type registration unit wherein:
(a) a third data type which includes a first necessary data is registered beforehand; and
(b) a fourth data type which includes a second necessary data is registered beforehand;
a type comparison unit for:
(a) comparing, when the first data type of the first sub-data is received via said wireless communication unit from said data accumulation device, the first data type of the first sub-data with:
(i) said registered third data type which includes said first necessary data; and
(ii) said registered fourth data type which includes said second necessary data; and
(b) comparing, when the second data type of the second sub-data is received via said wireless communication unit from said data accumulation device, the second data type of the second sub-data with:
(i) said registered third data type which includes said first necessary data; and
(ii) said registered fourth data type which includes said second necessary data;
a data extracting unit for extracting:
(a) said first data body if said compared first data type matches at least one of said registered third data type and said registered fourth data type; and
(b) said second data body if said compared second data type matches at least one of said registered third data type and said registered fourth data type;
a skip instruction unit configured to:
(a) if said compared first data type does not match said registered third data type and said registered fourth data type, transmit the first number to said data accumulation device, said data accumulation device being configured to, using said transmitted first number, skip transmission of said first data body; and
(b) if said compared second data type does not match said registered third data type and said registered fourth data type, transmit the second number to said data accumulation device, said data accumulation device being configured to, using said transmitted second number, skip transmission of said second data body; and
a data holding unit for holding said extracted data.

3. The data acquisition device of claim 2, wherein:
(a) said first sub-data is structured of the first data type, thereafter the first data length, and thereafter the first data body, said first data type and said first data length serving as data header information; and
(b) said data extracting unit is configured to remove the first data body of the length indicated in said first data length in the event that said first data type does not match.

4. The data acquisition device of claim 2, wherein said type registration unit is capable of registration of data types of unnecessary data; and
wherein said data extraction unit omits from extraction only data of which the data type matches that of said unnecessary data.

5. The data acquisition device of claim 2, wherein said wireless communication is performed using a Near Field Communication standard.

6. The data acquisition device of claim 2, wherein said data is sectioned into 16-byte blocks.

7. The data acquisition device of claim 2, wherein said wireless communication unit performs wireless communication of the first sub-data before the second sub-data.

8. A computer-readable medium storing instructions structured to cause a computer to:
   cause an acquisition communication unit to perform wireless communication of data with a data accumulation device in which data is accumulated, wherein said accumulated data includes:
   (a) a first sub-data including:
      (i) a first data type;
      (ii) a first number; and
      (iii) a first data body having a first size indicated by said first number; and
   (b) a second sub-data including:
      (i) a second data type;
      (ii) a second number; and
      (iii) a second data body having a second size indicated by said second number;
   cause a type registration unit to register beforehand:
   (a) a third data type which includes a first necessary data; and
   (b) a fourth data type which includes a second necessary data;
   cause a type comparison unit to:
   (a) compare, when the first data type of the first sub-data is received via said wireless communication unit from said data accumulation device, the first data type of the first sub-data with:
      (i) said registered third data type which includes said first necessary data; and
      (ii) said registered fourth data type which includes said second necessary data; and
   (b) compare, when the second data type of the second sub-data is received via said wireless communication unit from said data accumulation device, the second data type of the second sub-data with:
      (i) said registered third data type which includes said first necessary data; and
      (ii) said registered fourth data type which includes said second necessary data;
   cause a data extracting unit to extract:
   (a) said first data body if said compared first data type matches at least one of said registered third data type and said registered fourth data type; and
   (b) said second data body if said compared second data type matches at least one of said registered third data type and said registered fourth data type;
   cause a skip instruction unit to:
   (a) if said compared first type of data does not match the third data type and the fourth data type, transmit the first number to said data accumulation device, said data accumulation device being configured to, using said transmitted first number, skip transmission of said first data body; and
   (b) if said compared second type of data does not match the third data type and the fourth data type, transmit the second number to said data accumulation device, said data accumulation device being configure to skip transmission of said second data body; and
   cause a data holding unit to hold said extracted data.

9. A data acquisition method for acquiring data by wireless communication from a data accumulation device in which data is accumulated, wherein said accumulated data includes:
(a) a first sub-data including: (i) a first data type; (ii) a first number; and (iii) a first data body having a first size indicated by said first number; and (b) a second sub-data including: (i) a second data type; (ii) a second number; and (iii) a second data body having a second size indicated by said second number, said method comprising:
   registering beforehand a third data type which includes a first necessary data;
   registering beforehand a fourth data type which includes a second necessary data;
   receiving the accumulated data from said data accumulation device;
   comparing, when the first data type of the first sub-data is received via said wireless communication unit from said data accumulation device, the first data type of the first sub-data with:
   (a) said registered third data type which includes said first necessary data; and
   (b) said registered fourth data type which includes said second necessary data; and
   comparing, when the second data type of the second sub-data is received via said wireless communication unit from said data accumulation device, the second data type of the second sub-data with:
   (a) said registered third data type which includes said first necessary data; and
   (b) said registered fourth data type which includes said second necessary data;
   extracting:
   (a) said first data body if said compared first data type matches at least one of said registered third data type and said registered fourth data type; and
   (b) said second data body if said compared second data type matches at least one of said registered third data type and said registered fourth data type;
   causing said data accumulation device to:
   (a) if said compared first data type does not match said registered third data type and said registered fourth data type, skip transmission of said first data body based on said first number; and
   (b) if said compared second data type does not match said registered third data type and said registered fourth data type, skip transmission of said second data body based on said second number; and
   holding said extracted data.

10. A data accumulation device comprising:
   a wireless communication unit for performing wireless communication of data, said data including:
   (a) a first sub-data including:
      (i) a first data type;
      (ii) a first number; and
      (iii) a first data body having a first size indicated by said first number;
   (b) a second sub-data including:
      (i) a second data type;
      (ii) a second number; and
      (iii) a second data body having a second size indicated by said second number;
   a data holding unit for holding said data;
   a data transmission unit for transmitting said data held in said data holding unit to a data acquisition device via said wireless communication unit, in the event that said data acquisition device for acquiring data from said data acquisition device is within a communicable range, said data acquisition unit including a type comparison unit for:

(a) comparing, when the first data type of the first sub-data is received via said wireless communication unit from said data accumulation device, the first data type of the first sub-data with:
  (i) a registered third data type which includes said first necessary data; and
  (ii) a registered fourth data type which includes said second necessary data; and
(b) comparing, when the second data type of the second sub-data is received via said wireless communication unit from said data accumulation device, the second data type of the second sub-data with:
  (i) said registered third data type which includes said first necessary data; and
  (ii) said registered fourth data type which includes said second necessary data; and a skip execution unit configured to:
(a) if the compared first data type does not match the registered third data type and the registered fourth data type, skip transmission of said first data body based on said first number; and
(b) if the compared second data type does not march the registered third data type and the registered fourth data type, skip transmission of said second data body based on said second number.

11. The data accumulation device of claim 10, wherein:
(a) said first sub-data unit is structured of the first data type, thereafter the first data length, and thereafter the first data body, said first data type and said first data length serving as data header information; and
(b) said skip execution unit is configured to cause the first data body of the length indicated in said first data length to be skipped for sub-data units belonging to predetermined data types, in response to instructions from said data acquisition device.

12. The data accumulation device of claim 10, wherein said wireless communication is performed using a Near Field Communication standard.

13. The data accumulation device of claim 10, wherein said data is sectioned into 16-byte blocks.

14. The data accumulation device of claim 10, wherein said data accumulation device is an IC tag.

15. A computer-readable medium storing instructions structured to cause a computer to:
cause an accumulation communication unit to perform wireless communication of data, wherein said data includes:
  (a) a first sub-data including:
    a first data type;
    (ii) a first number; and
    (iii) a first data body having a first size indicated by said first number;
  (b) a second sub-data including:
    (i) a second data type;
    (ii) a second number; and
    (iii) a second data body having a second size indicated by said second number;
cause an accumulation holding unit to hold said data;
cause a data transmission unit to transmit said data held in said accumulation holding unit to a data acquisition device via said accumulation communication unit, in the event that said data acquisition device for acquiring data from said computer is within a communicable range, said data acquisition unit including a type comparison unit for:

(a) comparing, when the first data type of the first sub-data is received via said wireless communication unit from said data accumulation device, the first data type of the first sub-data with:
  (i) a registered third data type which includes said first necessary data; and
  (ii) a registered fourth data type which includes said second necessary data; and
(b) comparing, when the second data type of the second sub-data is received via said wireless communication unit from said data accumulation device, the second data type of the second sub-data with:
  (i) said registered third data type which includes said first necessary data; and
  (ii) said registered fourth data type which includes said second necessary data; and cause a skip execution unit to
(a) if the compared first data type does not match the third data type and the fourth data type, skip transmission of said first data body based on said first number; and
(b) if the compared second data type does not match the third data type and the fourth data type, skip transmission of said second data body based on said second number.

16. A method of operating a data accumulation unit, the method comprising:
providing a wireless communication unit configured to perform wireless communication of data, said data including:
  (a) a first sub-data including:
    (i) a first data type;
    (ii) a first number; and
    (iii) a first data body having a first size indicated by said first number;
  (b) a second sub-data including:
    (i) a second data type;
    (ii) a second number; and
    (iii) a second data body having a second size indicated by said second number;
a data registering step wherein data is registered beforehand;
an object detecting step wherein detection is made of a data acquisition device for acquiring data being within a communicable range;
a data transmitting step wherein data registered in said data registering is transmitted to said data acquisition device in the event that said data acquisition device is detected in said object detecting step, said data acquisition unit including a type comparison unit for:
(a) comparing, when the first data type of the first sub-data is received via said wireless communication unit from said data accumulation device, the first data type of the first sub-data with:
  (i) a registered third data type which includes a first necessary data; and
  (ii) a registered fourth data type which includes a second necessary data; and
(b) comparing, when the second data type of the second sub-data is received via said wireless communication unit from said data accumulation device, the second data type of the second sub-data with:
  (i) said registered third data type which includes said first necessary data; and
  (ii) said registered fourth data type which includes said second necessary data; and a skip executing step wherein transmission of the first data body is skipped in response to the first data type not matching the registered third data type and the registered fourth data type, wherein a data body of said data is skipped based on the first number.

17. A data acquisition device comprising:

a wireless communication unit for performing wireless communication of data with a data accumulation device in which data is accumulated, wherein said accumulated data includes:
  (a) a first sub-data including:
    (i) a first data type;
    (ii) a first number indicating a first size; and
    (iii) a first data body having a second size, said first size being greater than said second size; and
  (b) a second sub-data including:
    (i) a second data type;
    (ii) a second number indicating a third size; and
    (iii) a second data body having a fourth size, said third size being greater than said fourth size;

a type registration unit wherein:
  (a) a third data type which includes a first necessary data is registered beforehand; and
  (b) a fourth data type which includes a second necessary data is registered beforehand;

a type comparison unit for:
  (a) comparing, when the first data type of the first sub-data is received via said wireless communication unit from said data accumulation device, the first data type of the first sub-data with:
    (i) said registered third data type which includes said first necessary data; and
    (ii) said registered fourth data type which includes said second necessary data; and
  (b) comparing, when the second data type of the second sub-data is received via said wireless communication unit from said data accumulation device, the second data type of the second sub-data with:
    (i) said registered third data type which includes said first necessary data; and
    (ii) said registered fourth data type which includes said second necessary data;

a data extracting unit for extracting:
  (a) said first data body if said compared first data type matches at least one of said registered third data type and said registered fourth data type; and
  (b) said second data body if said compared second data type matches at least one of said registered third data type and said registered fourth data type;

a skip instruction unit for causing said data accumulation device to:
  (a) if said compared first data type does not match the third data type and the fourth data type, skip transmission of said first data body based on said first number; and
  (b) if said compared second data type does not match the third data type and the fourth data type, skip transmission of said second data body based on said second number; and a data holding unit for holding said extracted data.

* * * * *